J. R. POPE.
VEHICLE SPRING SUSPENSION.
APPLICATION FILED OCT. 11, 1917.
1,279,430.
Patented Sept. 17, 1918.
2 SHEETS—SHEET 1.
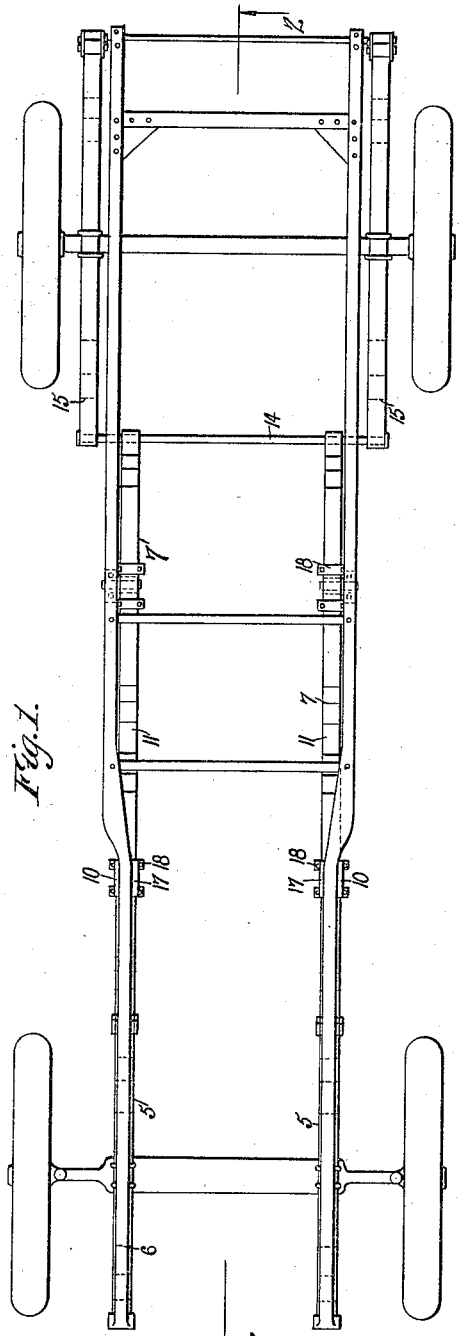
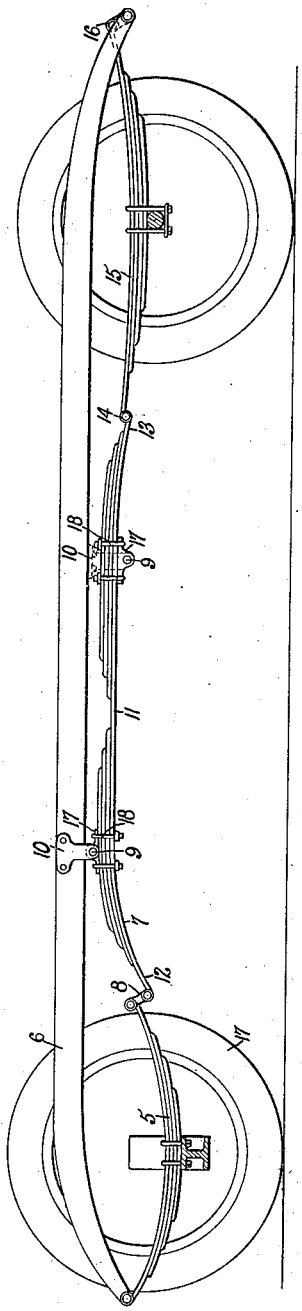
WITNESSES
INVENTOR
J. R. Pope
BY
ATTORNEYS

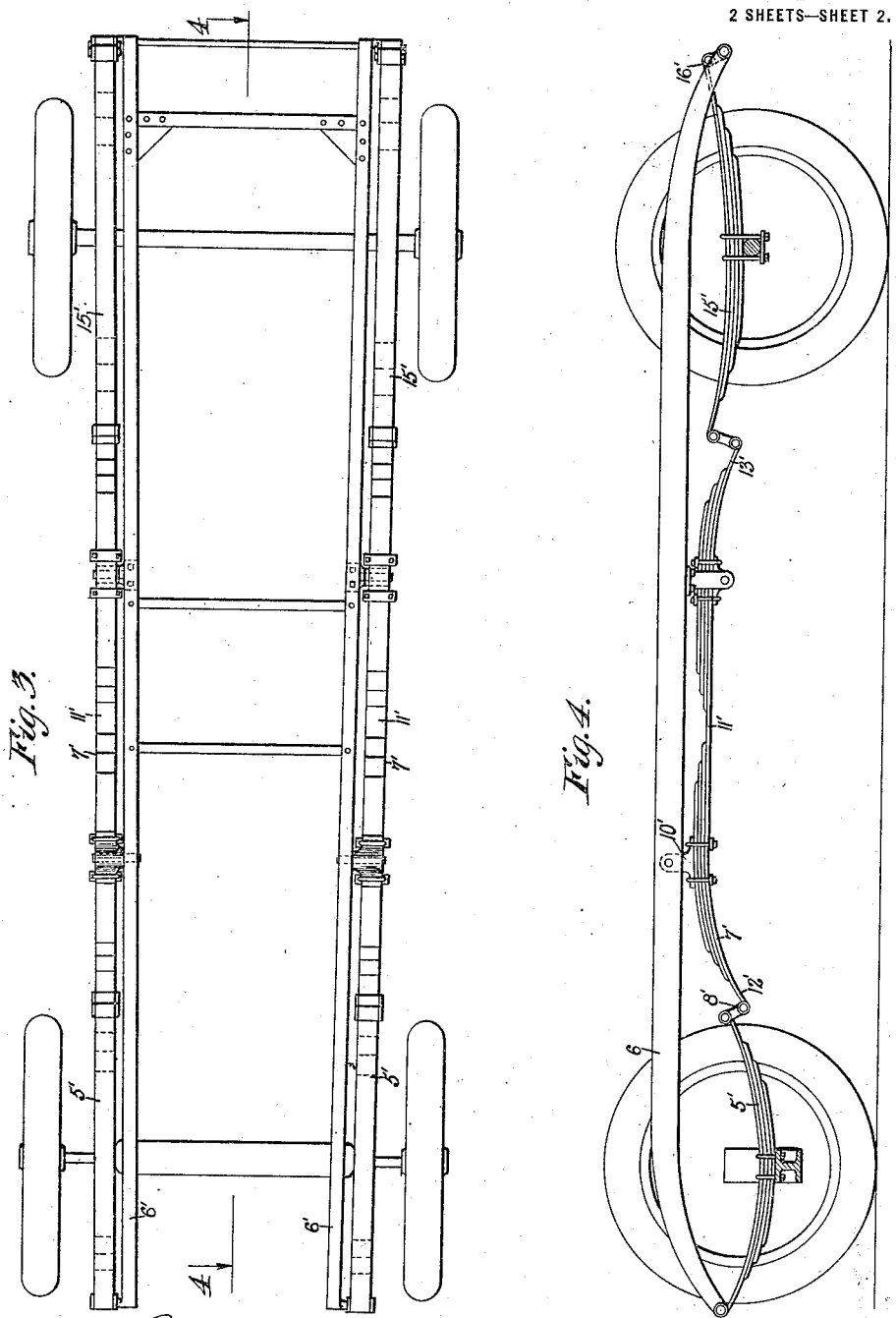

UNITED STATES PATENT OFFICE.

JOHN RUSSELL POPE, OF NEW YORK, N. Y.

VEHICLE SPRING SUSPENSION.

1,279,430.  Specification of Letters Patent.  Patented Sept. 17, 1918.

Application filed October 11, 1917. Serial No. 195,978.

*To all whom it may concern:*

Be it known that I, JOHN RUSSELL POPE, a citizen of the United States, and a resident of the city of New York, borough of Manhattan, in the county and State of New York, have invented a new and Improved Vehicle Spring Suspension, of which the following is a full, clear, and exact description.

The object of the invention is to relieve the frame of an automobile from shocks and prevent side sway by improving the spring-suspension system in use. The invention is characterized by the provision of yielding elements between the front and rear elliptical springs of automobiles.

Another characteristic of the invention is the transmission of the deflections of the front spring to the rear spring, or vice versa, thereby synchronizing the relative movement of the frame and spring suspension.

The above and other characteristics of the invention will appear as the description proceeds.

In the accompanying drawings, forming part of the application, similar characters of reference indicate corresponding parts in all the views.

Figure 1 is a plan view of a vehicle frame provided with a spring suspension embodying my invention;

Fig. 2 is a longitudinal vertical section on line 2—2, Fig. 1;

Fig. 3 is a plan view of a frame showing a modified form of spring suspension; and Fig. 4 is a longitudinal vertical section on line 4—4, Fig. 3.

Referring to the drawings, 5—5 are the front springs of a vehicle the forward extremities of which are connected pivotally to the frame 6. The rear extremity of each spring is connected to the adjacent end of an intermediate spring 7, the connection between the adjacent ends being established by a link 8. Each of the intermediate springs 7 is suspended from a frame 6 on pivots 9 carried by brackets 10 which are secured to the frame 6. The pivots are preferably carried in blocks 17 which are secured to the intermediate springs 7 by yokes 18 in the most inflexible parts of said springs, that is, in the thickest parts.

It will be noted that each of the intermediate springs is formed of two leaf springs rigidly connected at the points 11. It is self-evident that in place of a rigid connection a flexible connection may be provided, that is, a link or pivot uniting the leaves. The pivots 9 on which the intermediate spring is supported allow said spring to rock on said pivots and, in consequence, displace the extremities 12 and 13 of said spring, the extremities 12 being connected to the extremity of the front spring 5, while the extremity 13 engages the bar 14 which is connected to the ends of the rear semi-elliptical spring 15. The other extremities of the rear semi-elliptic springs are pivotally connected to the frame 6 by links 16.

If, for example, a shock is imparted to a front wheel 7, the corresponding spring 5 will move toward the frame 6, carrying therewith the end 12 of the intermediate spring 7 connected thereto. In consequence, the proximate section of the intermediate spring will rock on the pivot 9 causing the portion 11 of the intermediate spring to descend. This, in turn, will rock the other part of the intermediate spring on its pivot 9 causing the end 13 to rise and carry therewith the proximate end of the rear spring 15, thus, the motion of the springs 5 and 15 are substantially in the same direction and the displacement of the spring 5 may be said to be transmitted to the spring 15 so that a similar relative displacement between the spring and frame takes place, thus reducing the effect of a shock and, in consequence, making riding easier.

The provision of the intermediate springs 7 further increases the resiliency of the suspension, giving a better or more uniform distribution of stresses and strains which are imparted to the body of the frame during propulsion, and, in consequence, decreasing the strain on the various parts carried by the frame.

In the modified form shown in Figs. 3 and 4, the front, intermediate, and rear springs, 5′, 7′, and 15′ respectively are in alinement, the effect of the intermediate spring being identical with that previously described with the exception that each side of the suspension is entirely independent of the other, as the forward extremities of the rear springs are in no way connected and, in consequence, each side can work independently of the other.

I claim:

1. In a vehicle suspension, a frame, front springs disposed longitudinally of the frame, rear springs disposed longitudinally of the frame, and intermediate springs disposed longitudinally of the frame and each connected to said frame pivotally at two points and to said rear and front springs.

2. In a vehicle suspension, a frame, front semi-elliptic springs disposed longitudinally of the frame, rear semi-elliptic springs disposed longitudinally of the frame, intermediate semi-elliptic springs connected to the front and rear semi-elliptic springs on the same side of the frame, means suspending pivotally each of the intermediate semi-elliptic springs from two points of the frame, whereby the displacement of a front or rear semi-elliptic spring is transmitted to a rear or front semi-elliptic spring in substantially the same direction relative to the frame.

3. In a vehicle suspension, a frame, front springs for the frame, rear springs for the frame, intermediate semi-elliptic springs connected to the front and rear springs on the same side of the frame, means suspending pivotally each of the intermediate semi-elliptic springs from the frame, and means supporting pivotally each of the intermediate semi-elliptic springs from the frame, said suspending and supporting means being spaced so that a portion of said elliptic spring is located between said suspending and supporting means.

4. In a vehicle suspension, a frame, front springs for the frame, rear springs for the frame, intermediate semi-elliptic springs connected to the front and rear springs on the same side of the frame, a member suspending pivotally each of the intermediate semi-elliptic springs from the frame, a member supporting pivotally each of the intermediate semi-elliptic springs from the frame, said suspending and supporting means being spaced, and each of said intermediate springs having a point of maximum deflection between said suspending and supporting means.

JOHN RUSSELL POPE.

Copies of this patent may be obtained for five cents each, by addressing the "Commissioner of Patents, Washington, D. C."